United States Patent
Li et al.

(10) Patent No.: US 7,136,272 B2
(45) Date of Patent: Nov. 14, 2006

(54) LOW PARASITIC INDUCTANCE CAPACITOR WITH CENTRAL TERMINALS

(75) Inventors: Yuan-Liang Li, Chandler, AZ (US); Jiangqi He, Chandler, AZ (US); Dong Zhong, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 118 days.

(21) Appl. No.: 10/402,117

(22) Filed: Mar. 28, 2003

(65) Prior Publication Data

US 2004/0190218 A1    Sep. 30, 2004

(51) Int. Cl.
*H01G 4/35*    (2006.01)
(52) U.S. Cl. ............... 361/302; 361/306.1; 361/306.3; 361/311; 361/313; 361/321.1; 361/321.5
(58) Field of Classification Search ........ 361/302–305, 361/306.1, 321.1, 321.5, 301.4, 311–313, 361/306.3, 321.2, 301.2
See application file for complete search history.

(56) References Cited

U.S. PATENT DOCUMENTS

| | | | | |
|---|---|---|---|---|
| 5,093,774 A | * | 3/1992 | Cobb | 361/306.3 |
| 5,978,204 A | * | 11/1999 | Stevenson | 361/303 |
| 6,519,134 B1 | * | 2/2003 | Li et al. | 361/306.1 |
| 6,587,327 B1 | * | 7/2003 | Devoe et al. | 361/306.3 |
| 6,970,341 B1 | * | 11/2005 | Devoe et al. | 361/303 |
| 7,016,175 B1 | * | 3/2006 | MacNeal et al. | 361/306.3 |

* cited by examiner

*Primary Examiner*—Nguyen T. Ha
(74) *Attorney, Agent, or Firm*—Schwegman, Lundberg, Woessner & Kluth, P.A.

(57) ABSTRACT

A capacitor has at least one plate of a first polarity and at least two plates of a second polarity, with a terminal electrically connected to the at least two plates of the second polarity such that the electrical plate connections are remote from an edge of the connected plates.

14 Claims, 4 Drawing Sheets

LOW PARASITIC INDUCTANCE CAPACITOR WITH CENTRAL TERMINALS

FIELD OF THE INVENTION

The invention relates generally to capacitors, and more specifically to a capacitor design featuring low equivalent series inductance and a central terminal configuration.

BACKGROUND OF THE INVENTION

Electronic devices typically include a variety of common circuit components, including passive components such as resistors, inductors, and capacitors, as well as active components such as transistors and integrated circuits. Passive components such as inductors or capacitors are designed to store energy, and resistors are designed to resist the flow of applied current to a specified degree. Although a wide variety of passive components exist, most inductors are still coils of copper wire that are configured to have a specified opposition to changes in current flow, and most capacitors comprise conductive plates separated by an insulator and are configured to provide a specified opposition to change in voltage across the plates.

But, passive components in the real world do not have only those desired electrical characteristics described above. Every inductor has some resistance and a small amount of capacitance, and every capacitor has a small effective inductance and resistance. Although it is difficult to measure the resistance or inductance present across a capacitor because it includes a nonconductive layer, various methods of measuring and calculating an equivalent series inductance and an equivalent series resistance of a capacitor have been developed and are useful in characterizing capacitors. Equivalent series inductance, or ESL, is also sometimes called parasitic inductance, indicating that although it is present it is not desired.

One common application for capacitors is as a voltage stabilizing component that helps to maintain an applied voltage in the event of a voltage disruption or fluctuation. In order to efficiently and quickly supply its charge to maintain a voltage level in case of fluctuations, a capacitor must have a low equivalent series inductance so that the current supplied by the capacitor can change rapidly. Also, a low equivalent series resistance is desirable in that it results in less power being dissipated in the capacitor and more efficient transfer of the stored energy to maintain an applied voltage.

These voltage stabilizing capacitors are often called bypass capacitors, and are typically mounted very near the components for which they are intended to provide voltage stability. The close physical proximity is in large part intended to reduce the loop area through which supplied current must flow, resulting in a lower inductance in the capacitor's voltage supply path. As the clock speeds of computerized systems continues to increase, it becomes more difficult for capacitors with high equivalent series inductance or ESL to provide current to maintain a voltage as rapidly as the various electronic devices can demand current, and so close attention is paid to controlling and minimizing the ESL of capacitors used in such applications. It is therefore desirable to have a capacitor that is designed to provide a low equivalent series inductance or ESL.

DETAILED DESCRIPTION

In the following detailed description of sample embodiments of the invention, reference is made to the accompanying drawings which form a part hereof, and in which is shown by way of illustration specific sample embodiments in which the invention may be practiced. These embodiments are described in sufficient detail to enable those skilled in the art to practice the invention, and it is to be understood that other embodiments may be utilized and that logical, mechanical, electrical, and other changes may be made without departing from the spirit or scope of the present invention. The following detailed description is, therefore, not to be taken in a limiting sense, and the scope of the invention is defined only by the appended claims.

The present invention provides in various embodiments a capacitor having one or more terminals that are centrally attached to two or more plates of the same polarity. The centrally located terminal serves to reduce the loop area through which current conducted through the capacitor must travel, reducing the equivalent series inductance of the capacitor. In embodiments where plates of both a first and second polarity are connected to centrally located terminals, the equivalent series inductance is further minimized, resulting in a capacitor that is capable of significantly faster changes in drawn or supplied charge current.

Figure 1:
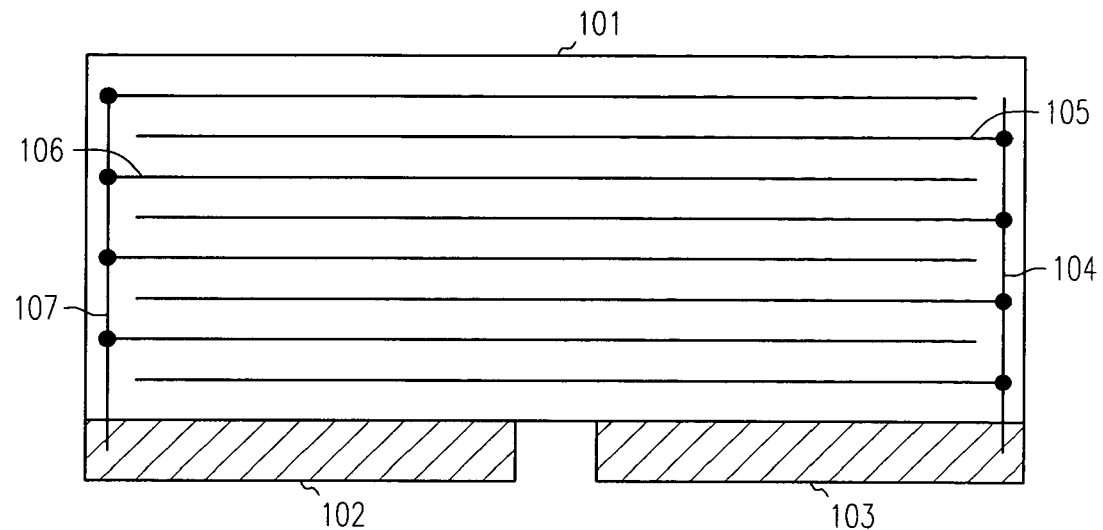
FIG. 1 shows a block diagram of a typical capacitor consistent with the prior art.

FIG. 1 illustrates a typical capacitor 101, consistent with the prior art. The capacitor comprises a pad of a first polarity 102 and a pad of a second polarity 103, each of which are connected via terminals to a number of plates. For example, pad 103 is connected via terminal 104 to plate 105, as well as to several other plates of the same polarity. These plates are interleaved in a stacked configuration with plates of the opposite polarity, including plate 106 connected to pad 102 via terminal 107. The individual plates are separated from contacting adjacent plates by a layer of a material that is nonconductive, so that direct current cannot flow from plates of one polarity to plates of the other polarity.

In operation, an applied electric voltage results in current flow into the capacitor until the capacitor is charged to the applied voltage level, at which time a charge in Coulombs equal to the applied Voltage multiplied by the capacitor's capacitance in Farads is stored. This charge is stored through attraction of electrons in the negatively charged plates to the positively charged plates of the capacitor. The current that a capacitor is receiving or accepting is directly proportional to the rate of voltage change in the capacitor, and the rate of current change and therefore the rate of change of the rate of change of the voltage are limited in part by the capacitor's equivalent series inductance. The equivalent series inductance therefore is a significant factor in the speed at which a charged capacitor can begin to supply its charge to a load, and in the speed with which the capacitor can begin to take on a new charge.

Current flowing through the capacitor, whether as an alternating current signal or as a charging or discharging direct current signal, travels through an effective loop area that includes the pad 102, the terminal 107, the plates connected to terminal 107 and the plates connected to terminal 104, terminal 104, and pad 103. Because the equivalent series inductance of the capacitor is roughly proportional to the geometric loop area around which current flows, the relatively large loop area of the current path in FIG. 1 results in a relatively large equivalent series inductance. The present invention seeks to reduce the equivalent series inductance of such a capacitor by changing the geometry of the capacitor.

Figure 2:
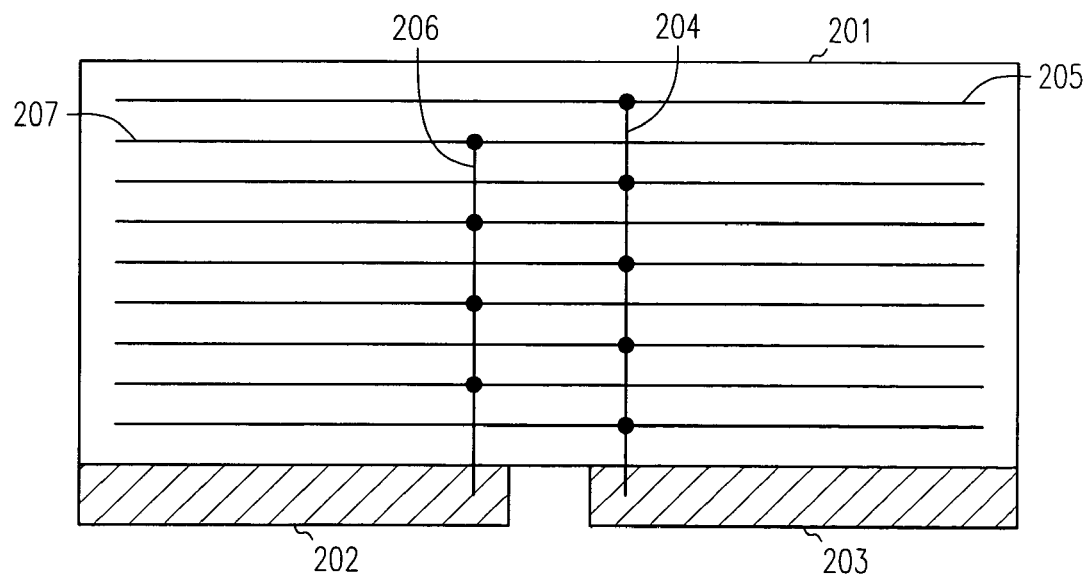
FIG. 2 shows a cross-section of a capacitor having central terminals, consistent with an embodiment of the present invention.

FIG. 2 illustrates a capacitor 201 having central terminals, consistent with an embodiment of the present invention. The capacitor features pads 202 and 203 through which electrical connection to a circuit can be made, where each pad is again connected via terminals to plates of opposite polarity. For example, pad 203 is connected to central terminal 204, which in turn is connected to plates of a first polarity including plate 205. Similarly, terminal 206 connects pad 202 to plates of a second polarity, including plate 207.

The capacitor of FIG. 2 differs significantly from the capacitor of FIG. 1 in that the novel capacitor of FIG. 2 utilizes terminals that are connected to the plates of the capacitor in a location central to the plates. Prior art capacitors utilized terminals that connected the plates from an edge of the plates, which although easier to manufacture results in a higher equivalent series inductance. Examination of the loop area formed from the pads through the terminals and across the plates in both FIGS. 1 and 2 illustrates how a significant a reduction in loop area is achieved by central location of the terminals in proximity to one another.

Figure 3A:
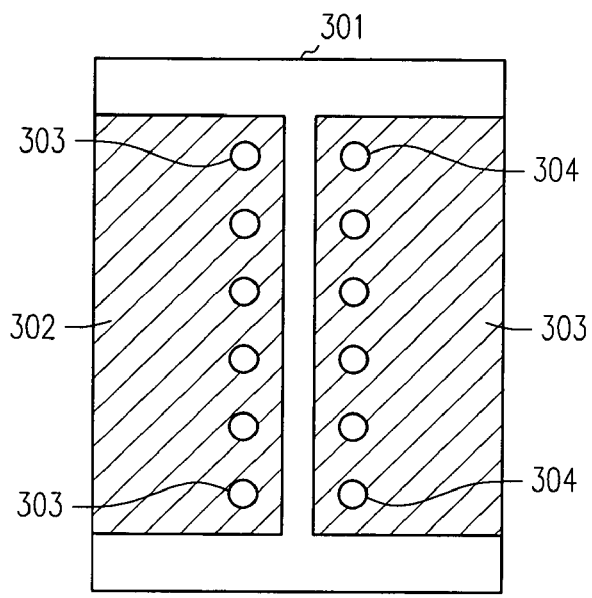
FIG. 3 shows a bottom view of a capacitor having central terminals, consistent with some embodiments of the present invention.
Figure 3B:
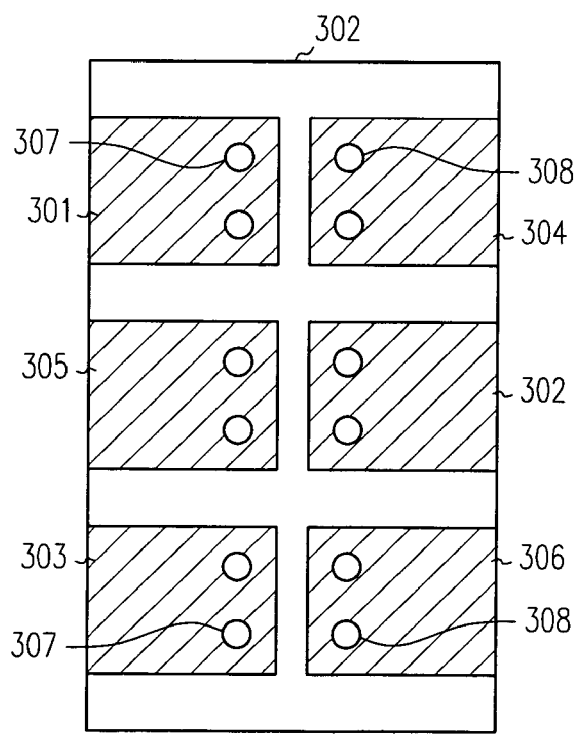
Figure 4A:
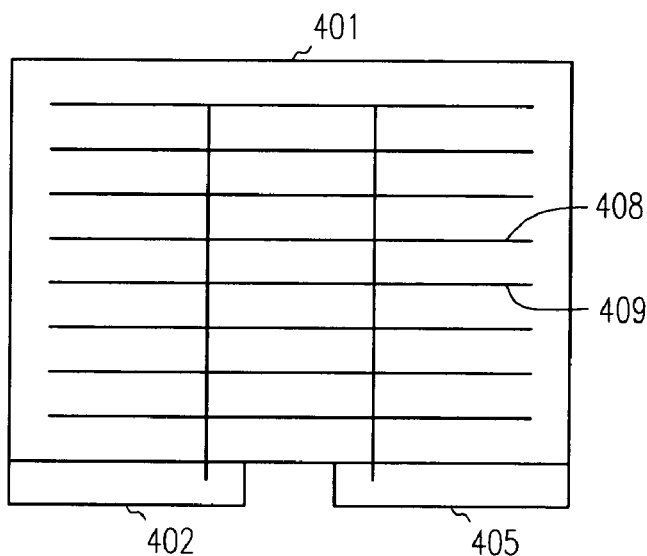
FIG. 4 shows alternating cross section plane views of a capacitor having central terminals, consistent with an embodiment of the present invention.
Figure 4B:
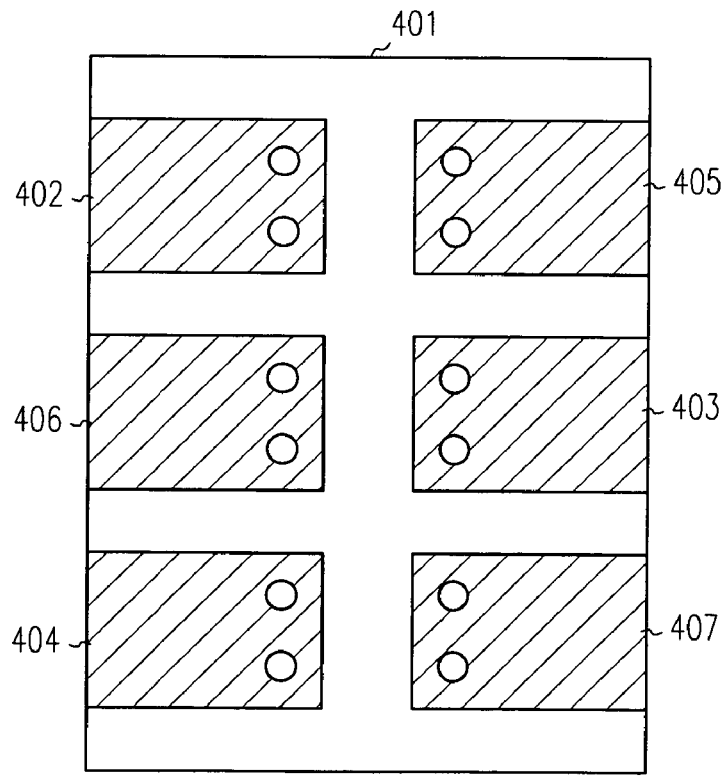
Figure 4C:
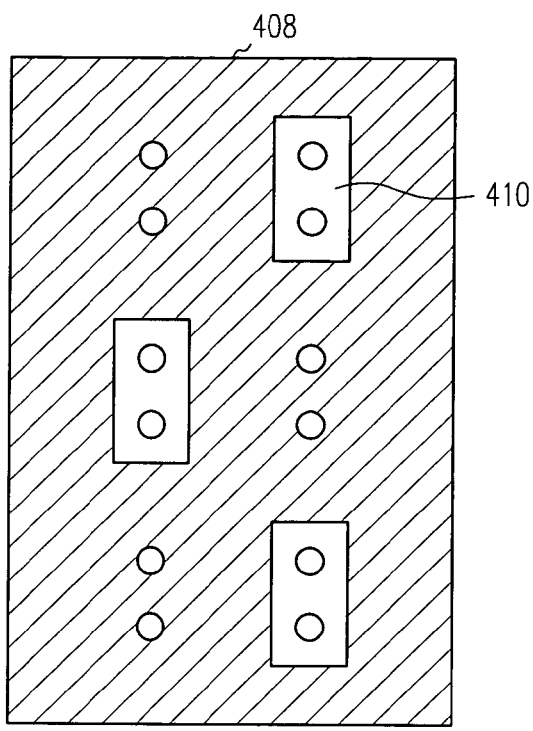
Figure 4D:
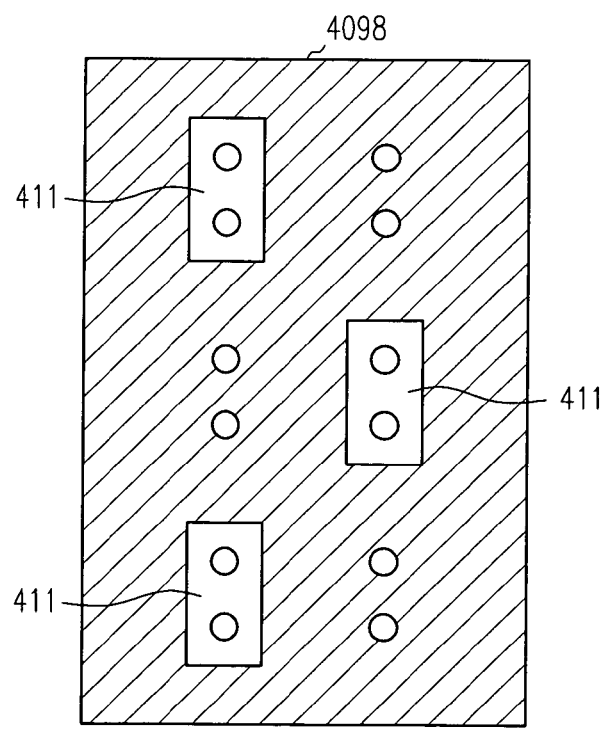

FIG. 3 is a capacitor bottom view illustrating how multiple central terminals are configured in some further embodiments of the present invention. Capacitor 301 has pads 302 and 303, each of which are to be connected to plates of opposite polarity. Pad 302 is connected to the plates via the six terminals 303, while pad 304 is connected to plates of an opposite polarity via the six terminals 304. Alternately, capacitor 302 has six pads, 301–306. Pads 301–303 are of a first polarity, and pads 304–306 are of a second polarity. The terminals 307 connect pads 301–303 to plates of the first polarity, while the terminals 308 connect pads 304–306 to the plates of the second polarity. The increase in the number of pads provides more than one external electrical connection point to external circuitry, which in some embodiments of the invention further reduces the equivalent series inductance of the capacitor.

FIG. 4 shows multiple views of a capacitor including alternating cross-section plane views of a central terminal capacitor, consistent with the present invention. The views presented in FIG. 4 illustrate how plates are connected and terminals are routed in one embodiment of the present invention.

Capacitor 401 has six pads, including pads 402–404 of a first polarity and pads 405–407 of a second polarity. These pads are connected via central terminals to alternating plates, including adjacent plates 408 and 409 of the capacitor. As shown in the alternating cross-section views of plates 408 and 409, each plate is configured to connect to terminals connected to pads of one polarity, but not to terminals connected to pads of the opposite polarity.

For example, plate 408 is connected via the terminals to pads 402, 403, and 404, but the cutout sections 410 prevent electrical connection to vias connected to pads 405, 406, and 407. Similarly, plate 409 is connected via terminals to pads 405, 406, and 407, but cutout areas 411 prevent electrical connection to the vias connected to pads 402, 403, and 404. In this manner, the stacked plates of capacitor 401 are alternately connected to pads of the first and second polarities, resulting in alternate pads being of alternating polarity.

FIG. 4 illustrates how the terminals of one example capacitor consistent with the present invention utilize terminals much like vias that extend from the pad or pads through the central region of the capacitor and its plates and are selectively connected only to those plates of the same polarity as the attached pad or pads. This configuration is more complex than the prior art capacitor of FIG. 1, and requires careful routing and electrical attachment of the terminals to the plates, but results in a significantly smaller loop area and therefore a significantly smaller equivalent series inductance.

This provides a capacitor with the desirable characteristic of being able to change the state of current flow through the device more rapidly, making the device more suitable for a variety of power and filtering applications. It is anticipated that various embodiments of the present invention will have a wide variety of applications, including bypass capacitors, power supply capacitors, filter capacitors, flash or strobe capacitors, and other capacitors where equivalent series inductance is desirably minimized.

The examples of capacitors with central terminals shown herein illustrate how a capacitor with central terminals can be configured to result in a lower equivalent series inductance than is found in an equivalent traditional capacitor. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is intended that this invention be limited only by the claims, and the full scope of equivalents thereof.

The invention claimed is:

1. A capacitor, comprising:
   two or more conductive plates of a first polarity;
   two or more conductive plates of a second polarity, wherein the two or more plates of a second polarity are interleaved with the two or more conductive plates of a first polarity and are separated from the two or more plates of a first polarity by a nonconductive material;
   a terminal of a first polarity electrically connected to the two or more conductive plates of a first polarity in a location of the two or more plates of a first polarity that is remote from any edge of the two or more plates of a first polarity, such that the terminal of the first polarity electrically couples the two or more conductive plates of the first polarity together; and
   a terminal of a second polarity electrically connected to the two or more conductive plates of a second polarity in a location of the two or more plates of a second polarity that is remote from any edge of the two or more plates of a second polarity, such that the terminal of the second polarity electrically couples the two or more conductive plates of the second polarity together.

2. The capacitor of claim 1, wherein the terminal of a first polarity is electrically connected to the two or more conductive plates of a first polarity in a location of the two or more plates such that the distance from the point of electrical connection to any edge is no less than ten percent of the distance from the point of electrical connection to any other edge of the two or more conductive plates of a first polarity.

3. The capacitor of claim 1, wherein the terminal of a second polarity is electrically connected to the two or more conductive plates of a second polarity in a location of the two or more plates such that the distance from the point of electrical connection to any edge is no less than ten percent of the distance from the point of electrical connection to any other edge of the two or more conductive plates of a second polarity.

4. The capacitor of claim 1, wherein the terminal of a first polarity is electrically connected to the two or more conductive plates of a first polarity in a location of the two or more plates such that the distance from the point of electrical connection to any edge is no less than twenty five percent of the distance from the point of electrical connection to any other edge of the two or more conductive plates of a first polarity.

5. The capacitor of claim 1, wherein the terminal of a second polarity is electrically connected to the two or more conductive plates of a second polarity in a location of the two or more plates such that the distance from the point of electrical connection to any edge is no less than twenty five percent of the distance from the point of electrical connection to any other edge of the two or more conductive plates of a second polarity.

6. The capacitor of claim 1, wherein at least one of the terminal of a first polarity and the terminal of a second polarity extends through the capacitor, providing a first and a second external electrical connection point for the terminal.

7. The capacitor of claim 1, wherein both the terminal of a first polarity and the terminal of a second polarity extend through the capacitor, providing a first and a second external electrical connection point for each terminal.

8. A capacitor, comprising:
   at least one plate of a first polarity;
   at least two plates of a second polarity;
   a terminal electrically connected to the at least two plates of the second polarity such that the electrical plate connections are remote from any edge of the connected plates and such that the terminal of the second polarity electrically couples the at least two plates of a second polarity together.

9. The capacitor of claim 8, wherein the terminal electrically connected to the at least two plates of a second polarity is connected in a location of the at least two plates such that the distance from the point of electrical connection to any edge is no less than ten percent of the distance from the point of electrical connection to any other edge of the at least two plates of a second polarity.

10. The capacitor of claim 8, wherein the terminal electrically connected to the at least two plates of a second polarity is connected in a location of the at least two plates such that the distance from the point of electrical connection to any edge is no less than twenty five percent of the distance from the point of electrical connection to any other edge of the at least two plates of a second polarity.

11. The capacitor of claim 8, wherein terminal electrically connected to the at least two plates of the second polarity extends through the capacitor, providing a first and a second external electrical connection point for the terminal.

12. The capacitor of claim 8, wherein the plates are in a stacked configuration.

13. The capacitor of claim 8, wherein the capacitor is a film-and-foil capacitor.

14. The capacitor of claim 8, wherein the capacitor is a metallized film capacitor.

* * * * *